(12) United States Patent
Kim et al.

(10) Patent No.: US 9,938,427 B2
(45) Date of Patent: Apr. 10, 2018

(54) RADIATION CURABLE PAINT COMPOSITION AND MOLDED PRODUCT COMPRISING CURED COATING LAYER FORMED THEREFROM

(71) Applicant: KCC CORPORATION, Seoul (KR)

(72) Inventors: Jang Wook Kim, Gyeonggi-do (KR); Kyu Yeob Park, Gyeonggi-do (KR); Kang Soo Kim, Gyeonggi-do (KR); Suk Hwa Ryu, Seoul (KR)

(73) Assignee: KCC CORPORATION, Seoul (KR)

( * ) Notice: Subject to any disclaimer, the term of this patent is extended or adjusted under 35 U.S.C. 154(b) by 107 days.

(21) Appl. No.: 14/894,631

(22) PCT Filed: Jun. 2, 2014

(86) PCT No.: PCT/KR2014/004889
§ 371 (c)(1),
(2) Date: Nov. 30, 2015

(87) PCT Pub. No.: WO2014/193201
PCT Pub. Date: Dec. 4, 2014

(65) Prior Publication Data
US 2016/0108277 A1    Apr. 21, 2016

(30) Foreign Application Priority Data
May 31, 2013    (KR) .......................... 10-2013-0062435

(51) Int. Cl.
| | |
|---|---|
| *C09D 151/08* | (2006.01) |
| *B60Q 1/04* | (2006.01) |
| *C08J 7/04* | (2006.01) |
| *C09D 5/00* | (2006.01) |
| *C09D 7/12* | (2006.01) |
| *C09D 4/00* | (2006.01) |
| *C08G 18/67* | (2006.01) |
| *C08G 18/81* | (2006.01) |
| *C09D 175/14* | (2006.01) |
| *C09D 133/14* | (2006.01) |

(52) U.S. Cl.
CPC ............ *C09D 151/08* (2013.01); *B60Q 1/04* (2013.01); *C08G 18/673* (2013.01); *C08G 18/8175* (2013.01); *C08J 7/047* (2013.01); *C09D 4/00* (2013.01); *C09D 5/00* (2013.01); *C09D 7/12* (2013.01); *C09D 7/1241* (2013.01); *C09D 133/14* (2013.01); *C09D 175/14* (2013.01); *C08J 2369/00* (2013.01); *C08J 2451/08* (2013.01); *C08L 2312/06* (2013.01)

(58) Field of Classification Search
CPC .... B60Q 1/04; C08G 18/673; C08G 18/8175; C08J 2369/00; C08J 2451/08; C08J 7/047; C08L 2312/06; C09D 133/14; C09D 151/08; C09D 175/14; C09D 4/00; C09D 5/00; C09D 7/12; C09D 7/1241
USPC ...................................... 428/423.1; 522/1, 6
See application file for complete search history.

(56) References Cited

U.S. PATENT DOCUMENTS

| 7,375,144 | B2 | 5/2008 | Gilmer ............................ 522/92 |
|---|---|---|---|
| 8,754,145 | B1 * | 6/2014 | Haubrich ............. C09D 133/08 520/1 |
| 2005/0136252 | A1 * | 6/2005 | Chisholm ................ C09D 4/00 428/352 |
| 2011/0014477 | A1 | 1/2011 | Kawai et al. .................. 428/412 |
| 2012/0114933 | A1 * | 5/2012 | Meyer Zu Berstenhorst .............................. C09D 175/16 428/331 |

FOREIGN PATENT DOCUMENTS

| JP | 2001-162717 | 6/2001 | ............. B32B 9/00 |
|---|---|---|---|
| JP | 2005-320517 | 11/2005 | .......... C09D 201/02 |
| JP | 2008-546872 | 12/2008 | .............. C09D 4/02 |
| KR | 10-2007-0039742 | 4/2007 | .......... C09D 175/06 |
| KR | 10-2011-0050952 | 5/2011 | .......... C09D 133/08 |
| KR | 10-2012-0097817 | 9/2012 | .............. C09D 4/02 |
| KR | 10-2013-0042362 | 4/2013 | .............. C09D 4/02 |

OTHER PUBLICATIONS

International Search Report (ISR) dated Sep. 19, 2014 in PCT/KR2014/004889 published as WO 2014/193201 with English Translation.

* cited by examiner

*Primary Examiner* — Thao T Tran
(74) *Attorney, Agent, or Firm* — Harness, Dickey & Pierce, P.L.C.

(57) ABSTRACT

The present invention relates to a radiation curable paint composition and a molded product comprising a cured coating layer formed therefrom, and more specifically, to: a radiation curable paint composition comprising a polyfunctional polyurethane acrylate being at least pentafunctional, a mono- or difunctional polyurethane acrylate, a mono-, di- or trifunctional acrylate, a photopolymerization initiator, and a triazine-based UV absorber, wherein physical properties such as adhesion to a metal or plastic substrate, water resistance, moisture resistance, heat resistance, thermal shock resistance and the like are remarkable, and particularly, weather resistance is remarkable, and thus it is useful for a hard coating for a plastic substrate, and particularly, for an automobile headlamp; and a molded product comprising a cured coating layer formed therefrom.

11 Claims, No Drawings

RADIATION CURABLE PAINT COMPOSITION AND MOLDED PRODUCT COMPRISING CURED COATING LAYER FORMED THEREFROM

CROSS-REFERENCE TO RELATED APPLICATIONS

This application is a national phase application of PCT Application No. PCT/KR2014/004889, filed on 2 Jun. 2014, which claims benefit of Korean Patent Application 10-2013-0062435, filed on 31 May 2013. The entire disclosure of the application identified in this paragraph is incorporated herein by reference.

FIELD

The present invention relates to a photocurable paint composition and a molded article including a cured coating layer formed from the same, and more particularly, to a photocurable paint composition for a plastic substrate e.g., a polycarbonate (PC) substrate or a poly(methyl methacrylate) (PMMA) substrate, particularly for an automobile headlamp molded article, and a molded article including a cured coating layer formed from the photocurable paint composition. In the present invention, the photocurable paint composition includes multifunctional polyurethane acrylate having 5 or more functional groups, monofunctional or difunctional polyurethane acrylate, difunctional or trifunctional acrylate, photo initiator and triazine-based ultraviolet absorbent. The photocurable paint composition is excellent in physical properties such as adhesive property, water resistance, humidity resistance, heat resistance, thermal shock resistance, particularly weatherability with respect to the plastic substrate.

BACKGROUND

In a plastic molded article, more specifically in an automotive molded article, furthermore specifically in an automotive headlamp lens, an automotive headlamp PC lens requires characteristics such as high hardness or wear resistance. A paint composition for the hard coating of the automotive headlamp PC lens requires excellent productivity, adhesive property, water resistance, weatherability, etc. Further, the superior external appearance and productivity of the paint composition for automotive parts may be secured when the paint composition is coated by an air spray coating method.

Therefore, there is a need for an ultraviolet curable coating for plastic molded articles having excellent heat resistance and adhesive property, in response to recent environmental regulations and demands for improved productivity and a reduced manufacturing cost with a reduced cost for paint materials. Also, such coating is required to be applied with various methods such as a showering method, a curtain flow coating, etc., as well as an air spray method.

Korean Patent Publication No. 10-2007-0039742 discloses an example of paint compositions containing photocurable oligomers. However, a coating film as disclosed in the publication is formed with the paint composition having a multifunctional urethane acrylate oligomer alone. The coating film may show a crack or breakage due to the intermolecular contraction stresses within the coating film when the thickness of a dried coating film is 12 µm or greater, thereby causing the deterioration of the external appearance of the coating film, or decreasing the adhesive property of the coating film.

Korean Patent Publication No. 10-2011-0050952 discloses an ultraviolet curable paint composition having improved chipping resistance by using a combination of a multifunctional aliphatic urethane acrylate oligomer and a polycarbonate modified aliphatic urethane acrylate oligomer. However, the paint composition disclosed in the publication requires improvements in weatherability.

DISCLOSURE OF INVENTION

Technical Problem

In order to solve the above-described problems, an aspect of the present invention may provide a photocurable paint composition and a molded article including a cured coating layer formed from the photocurable paint composition. In the present invention, the photocurable paint composition may be used for a plastic substrate and may be useful particularly in an automotive headlamp molded article, electric and electronic articles and other industrial supplies since the photocurable paint composition is excellent in physical properties such as adhesive property, water resistance, humidity resistance, heat resistance, thermal shock resistance, particularly weatherability with respect to the plastic substrate, e.g., a polycarbonate (PC) substrate.

Technical Solution

In accordance with an exemplary embodiment of the present invention, a photocurable paint composition may include (A) multifunctional polyurethane acrylate having 5 or more functional groups, (B) monofunctional or difunctional polyurethane acrylate, (C) monofunctional to trifunctional acrylate, (D) photo initiator, (E) triazine-based ultraviolet absorbent having two or more UV absorber groups, and (F) organic solvent.

In accordance with another exemplary embodiment of the present invention, a molded article may include a cured coating layer formed from the photocurable paint composition of the present invention.

Effects

A photocurable paint composition according to the present invention can be recycled with a high productivity, and thus, is environmentally friendly. Further, the photocurable paint composition is excellent in initial color (color sense) compared to colors of existing products, and shows excellent weatherability in both a long wavelength range of 300 nm or longer and a short wavelength range of 300 nm or shorter. Still further, the photocurable paint composition is excellent in physical properties such as adhesive property, water resistance, humidity resistance, heat resistance, thermal shock resistance, etc. Therefore, the photocurable paint composition can be applicable in plastic molded articles, particularly in automotive headlamps.

BEST MODE

Preferred embodiments of the present invention will be described below in more detail. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, the present invention will be described in detail.

(A) A Multifunctional Polyurethane Acrylate having Penta or Higher Functional Groups A multifunctional polyurethane acrylate (A) included in a photocurable paint composition of the present invention is an aliphatic polyurethane acrylate oligomer having at least 5, for example, 5 to 15 polymerizable functional groups, more preferably at least 6, for example, 6 to 15 polymerizable functional groups as polymerizable unsaturated groups, and is a component used for heat resistance and hardness of the coating film. If the number of polymerizable functional groups in a molecular of the component A is less than 5, there are problems that, after curing a coating film, scratch resistance of the coating film is deteriorated, and external appearance of the coating film becomes poor.

Examples of the multifunctional polyurethane acrylate (A) may include products formed by the reaction with hydroxyl acrylate monomers, for example, pentaerythritol triacrylate and dipentaerythritol triacrylate, containing per a molecule 3 or more unsaturated groups that are polymerizable with aliphatic isocyanate compounds having two functional groups, for example, hexamethylene diisocyanate, dicyclohexylmethane diisocyanate, isoporone diisocyanate, etc. Preferably, the component A has a weight average molecular weight of 1000 to 2000. As examples of the component A, there are Miramer PU610, Miramer SC2100 and Miramer SC2152 of Miwon Commercial Co., Ltd, 1290 of SK-Cytec Co., Ltd, etc.

A photocurable paint composition of the present invention includes preferably 10 to 30% by weight, more preferably 15 to 30% by weight of the component A based on the total weight of the composition. If the component A is contained in the photocurable paint composition in an amount of less than 10% by weight of the total composition weight, it is difficult to form a cured coating film, and hardness and heat resistance of the coating film are lowered. If the component A is contained in the photocurable paint composition in an amount of more than 30% by weight of the total composition weight, the cracking in the coating film may be caused by excessive cross linking density of the photocurable paint composition.

(B) Monofunctional to Difunctional Polyurethane Acrylate

A monofunctional to difunctional polyurethane acrylate (B) included in a photocurable paint composition of the present invention is an aliphatic polyurethane acrylate oligomer having 1 polymerizable functional group or 2 polymerizable functional groups, more preferably 2 polymerizable functional groups as polymerizable unsaturated groups. Preferably, the functional polyurethane acrylate (B) has a weight average molecular weight of 2000 to 4000. As an example of the component B, Miramer UA5095 of Miwon Commercial Co., Ltd can be used.

A photocurable paint composition of the present invention includes preferably 5 to 20% by weight, more preferably 10 to 20% by weight of the component B based on the total weight of the composition. If the component B is contained in the photocurable paint composition in an amount of less than 5% by weight of the total composition weight, the adhesive property of the coating film may be weakened. If the component B is contained in the photocurable paint composition in an amount of more than 20% by weight of the total composition weight, the wear resistance and hardness of a hard coating film may become poor.

Further, a photocurable paint composition of the present invention may include preferably 30 to 70% by weight, more preferably 40 to 60% by weight of the component B based on 100 weight parts of the component A. If consumption amounts of the component A compared to the component B are excessively less than the above-mentioned amount levels, cracking or adhesion defects can be occurred. If the consumption amounts of the component A compared to the component B are excessively greater than the above-mentioned amount levels, the hardening rate of the photocurable paint composition is slowed down so that it may be difficult to form a coating film from the photocurable paint composition.

(C) Monofunctional to Trifunctional Acrylates

Monofunctional to trifunctional acrylates (C) included in a photocurable paint composition of the present invention is an acrylate monomer or oligomer having 1 to 3 polymerizable functional groups as polymerizable unsaturated groups. Examples of the monofunctional to trifunctional acrylates (C) may include monofunctional acrylates such as tetrahydrofurfuryl acrylate and 2-phenoxy ethyl acrylate, difunctional acrylates such as 1,6-hexanediol diacrylate and 1,6-hexanediol dimethacrylate, trifunctional acrylates such as trimethylolpropane triacrylate and pentaerythritol triacrylate, and combinations of two or more thereof.

A photocurable paint composition of the present invention includes preferably 5 to 25% by weight, more preferably 10 to 25% by weight of the component C based on the total weight of the composition. If the component C is contained in the photocurable paint composition in an amount of less than 5% by weight of the total composition weight, the wear resistance such as scratch resistance may be deteriorated, and the hardening rate may be slowed down. If the component C is contained in the photocurable paint composition in an amount of more than 25% by weight of the total composition weight, a hard coating film may be cracked, and the adhesion of the hard coating film is reduced. According to exemplary embodiments of the present invention, monofunctional acrylates or difunctional acrylates, together with trifunctional acrylates, may be used as the component C. In this case, the monofunctional acrylates or the difunctional acrylates may be used in an amount of preferably 30 to 90 weight parts, more preferably 40 to 80 weight parts based on 100 weight parts of the trifunctional acrylates.

(D) Photo Initiator

Photo initiator (D) included in a photocurable paint composition of the present invention is a component used for hardening a coating film-forming component. Examples of the photo initiator (D) may include 2-hydroxy-2-methyl-1-phenylpropane-1-phenone, 1-hydroxycyclohexylphenylketone, 2-hydroxy-2-methyl-1-phenyl-1-propaneon, cyclohexylphenylketone, benzophenone, 1-(4-isopropylphenyl)-2-hydroxy-2-methyl-1-on, 1-[4-(2-hydroxyethoxy)phenyl]-2-hydroxy-2-methyl-propane-1-on, α,α-diethoxyacetophenone, 2,2-diethoxy-1-phenylethanone, bis (2,4,6-trimethylbenzoyl)-phenylphosphine oxide, and combinations of two or more thereof.

According to exemplary embodiments of the present invention, combinations of short-wavelength absorption initiators with a wavelength of 300 nm or shorter such as 1-hydroxycyclohexylphenylketone (Trade Name: Micure CP-4, Producer: Miwon Commercial Co., Ltd and long-wavelength absorption initiators with a wavelength of longer than 300 nm such as bis (2,4,6-trimethylbenzoyl)-phenyl-phosphine oxide (Trade Name: Lucirin TPO, Producer: BASF Corporation) may be used as the component D.

A photocurable paint composition of the present invention includes preferably 0.5 to 3% by weight of the component D based on the total weight of the composition. If the component D is contained in the photocurable paint composition in an amount of less than 0.5% by weight of the total composition weight, the external appearances or the physical properties may be deteriorated due to low hardness and uncuring. If the component D is contained in the photocurable paint composition in an amount of more than 5% by weight of the total composition weight, the contamination due to unreacted photo initiator, or low adhesion property or cracks due to low polymerization degree may be caused. If the component D includes both short-wavelength absorption initiators and long-wavelength absorption initiators, the long-wavelength absorption initiators may be used in an amount of preferably 10 to 30 weight parts based on 100 weight parts of the short-wavelength absorption initiators.

(E) UV Absorber

An UV absorber (E) included in a photocurable paint composition of the present invention is triazine-based ultraviolet absorbent having two or more UV absorber groups. More preferably, hydroxyl phenyl triazine derivatives having two or more ultraviolet-absorbing ester groups or combinations of two or more thereof may be used as the UV absorber (E). The component E may improve weatherability in long and short wavelength areas of a coating film, for example, UV-A, UV-B and UV-C areas, particularly weatherability in short wavelength areas of 300 nm or shorter of the coating film, for example, UV-B and UV-C areas. It is preferable that the UV absorber (E) has a molecular weight of 500 g/mol or more, for example, not less than 500 g/mol but not more than 2000 g/mol. Since the volatility and extractability of the UV absorber (E) are large if the molecular weight of the UV absorber (E) is less than 500 g/mol, it is difficult for a ultraviolet absorbent component to be remained in the coating film during outdoor exposure, and thus, the durability and weatherability of the coating film may be lowered.

A photocurable paint composition of the present invention includes preferably 0.01 to 2.5% by weight, more preferably 0.1 to 2% by weight of the component E based on the total weight of the composition. If the component E is contained in the photocurable paint composition in an amount of less than 0.01% by weight of the total composition weight, it is difficult to improve the weatherability of the coating film. Although the component E is contained in the photocurable paint composition in an amount of more than 2.5% by weight of the total composition weight, the weatherability is not further improved, and the hardening disorder occurs during the ultraviolet hardening process.

(F) Organic Solvent

Examples of the organic solvent (F) included in a photocurable paint composition of the present invention may include inert organic solvents usually used in the paint composition, for example, alcohols such as methoxy propanol, isopropyl alcohol, etc., ketones such as acetone, etc., acetates such as ethylacetate, etc., aromatic compounds such as toluene, etc., and combinations thereof, and may preferably include as single solvents alcohols such as methoxy propanol, isopropyl alcohol, etc.

A photocurable paint composition of the present invention includes preferably 30 to 70% by weight, more preferably 30 to 60% by weight of the component F based on the total weight of the composition. If the component F is contained in the photocurable paint composition in an amount of less than 30% by weight of the total composition weight, the workability or leveling of a coating film may be lowered. If the component F is contained in the photocurable paint composition in an amount of more than 70% by weight of the total composition weight, the formation of the coating film may be easily deteriorated.

A photocurable paint composition of the present invention may additionally include components that are typical additives of the paint composition, for example, a ultraviolet stabilizer such as HALS, an antioxidant such as a phenol based antioxidant, a wetting agent such as polyether modified polydimethylsiloxane, a leveling agent such as a silicone diacrylate based compound or a silicone polyacrylate based compound, an antifoaming agent such as dimethylpolysiloxane, and so on. These additional components reinforce the workability of a paint and flatness of a coating film. It is preferable that each of the additional components is used in an amount of no more than 5% by weight with respect to 100% by weight of the total paint composition.

A photocurable paint composition of the present invention may be prepared with various methods. For example, the photocurable paint composition may be prepared by mixing the components A to F with the additives at an appropriate temperature such as a room temperature after injecting the above-described components A to F along with additional additives as needed into mixing equipment such as a dissolver, a stirrer, etc.

In accordance with another exemplary embodiment of the present invention, a molded article may include a cured coating layer formed from the above-described photocurable paint composition of the present invention.

Examples of material for a molded article to which a photocurable paint composition of the present invention is applicable may include a plastic substrate such as polycarbonate. In accordance with the present invention, after a photocurable paint composition of the present invention is coated and dried on the surface of the molded article made of such material, the photocurable paint composition coated and dried on the molded article is cured by ultraviolet irradiation to form a coating layer. A photocurable paint composition of the present invention is applied preferably to an automotive molded article, more preferably to an automotive headlamp.

Hereinafter, the present invention will be described in more detail with reference to the following examples and comparative examples. However, the following examples and comparative examples are provided for illustrative purposes only, and the scope of the present invention should not be limited thereto in any manner.

EXAMPLES (1) Preparation of Photocurable Paint Compositions

Examples 1-7

Photocurable paint compositions for vacuum deposition were respectively prepared from compositions represented in the following Table 1.

TABLE 1

(Contents: Weight Parts)

| Component | | Example 1 | Example 2 | Example 3 | Example 4 | Example 5 | Example 6 | Example 7 |
|---|---|---|---|---|---|---|---|---|
| A | A-1 | 20 | — | — | — | — | — | — |
|   | A-2 | — | 20 | — | — | — | 20 | 20 |
|   | A-3 | — | — | 20 | — | — | — | — |
|   | A-4 | — | — | — | 20 | — | — | — |
|   | A-5 | — | — | — | — | 20 | — | — |
| B |   | 10 | 10 | 10 | 10 | 10 | 10 | 10 |
| C | C-1 | 4 | 4 | 4 | 4 | 4 | 4 | 4 |
|   | C-2 | 4 | 4 | 4 | 4 | 4 | 4 | 4 |
|   | C-3 | 10 | 10 | 10 | 10 | 10 | 10 | 10 |
| D | D-1 | 1 | 1 | 1 | 1 | 1 | 1 | 1 |
|   | D-2 | 0.2 | 0.2 | 0.2 | 0.2 | 0.2 | 0.2 | 0.2 |
| E |   | 0.8 | 0.8 | 0.8 | 0.8 | 0.8 | 1.6 | 0.4 |
| F |   | 50 | 50 | 50 | 50 | 50 | 49.2 | 50.4 |

Penta-functional polyurethane acrylate [KCC self-synthesized penta-functional resin].

A-2: Hexa-functional polyurethane acrylate [Miramer PU610, Miwon Commercial Co., Ltd.].

A-3: Nona-functional polyurethane acrylate [Miramer SC2100, Miwon Commercial Co., Ltd.].

A-4: Decadi-functional polyurethane acrylate [Miramer SC2153, Miwon Commercial Co., Ltd.].

A-5: Decapenta-functional polyurethane acrylate [Miramer SC2152, Miwon Commercial Co., Ltd.].

B: Di-functional polyurethane acrylate having a molecular weight of 3600 [Miramer UA5095, Miwon Commercial Co., Ltd.].

C-1: Mono-functional acrylate monomer (Tetrahydrofurfuryl Acrylate).

C-2: Di-functional acrylate monomer (1, 6-Hexanediol Diacrylate).

C-3: Tri-functional acrylate monomer (Trimethylolpropane Triacrylate).

D-1: Short-wavelength initiator (1-hydroxycyclohexylphenylketone) [Micure CP-4, Miwon Commercial Co., Ltd.].

D-2: Long-wavelength initiator (bis (2, 4, 6-trimethylbenzoyl)-phenylphosphineoxide) [Lucirin TPO, BASF Corporation].

E: Triazine-based ultraviolet absorbent having two UV absorber groups.

F: Organic solvent (methoxy propanol).

(2) Evaluating Physical Properties of Photocurable Paint Compositions

The photocurable paint compositions prepared in the Examples were applied to automotive headlamps to evaluate the physical properties of the photocurable paint compositions applied to the automotive headlamps. The photocurable paint compositions prepared in the Examples were coated to a thickness of 12 μm on headlamp reflector specimens made of polycarbonate (PC) using a spray coater, the photocurable paint compositions coated on the headlamp reflector specimens were subjected to hot air drying at a temperature condition of 80° C. for 300 seconds to remove solvents from the photocurable paint compositions, an energy amount of 3500 mj/cm$^2$ was irradiated to the dried photocurable paint compositions from a position in the air that was 20 cm distanced from the photocurable paint compositions by a mercury lamp having a high pressure of 180 mW/cm$^2$, and then the energy-irradiated photocurable paint compositions were cured to manufacture specimens for testing physical properties.

Specimens were manufactured in the same manner by using as Comparative Examples a (Red Spot) UVT-610 product of Fujikura (Comparative Example A), a UVHC-3000 product of Momentive (Comparative Example B), and a composition of Example 1 of Korean Patent Publication No. 10-2011-0050952 (Comparative Example C).

The following physical properties were evaluated on the manufactured specimens, and the evaluation results were represented in the following Table 2.

1) Adhesive property test: Evaluations of the specimens are done by performing cross cut tape tests on the specimens in accordance with ASTM D3359.

2) Humidity resistance test: After leaving alone the specimens at a test temperature condition of 50±2° C. and a relative humidity condition of 98±2% for 240 hours, the specimens were taken out to leave them alone for 1 hour, and humidity resistance tests of the specimens were evaluated by checking if there were remarkable discoloration, decolorization, swelling, cracks, gloss drop, etc. on coating films, and if there were something wrong with adhesive properties of the coating films [very excellent: ⊚, excellent: ○, moderate: Δ, poor: x].

3) Water resistance test: After dipping the specimens into tap water at a test temperature of 40° C. for 240 hours, the specimens were taken out, water on surfaces of the specimens was removed by an air blower, the water-removed specimens were left alone at room temperature for one hour, and water resistance tests of the specimens were evaluated by checking if there were remarkable discoloration, decolorization, swelling, cracks, gloss drop, etc. on coating films, and if there were something wrong with adhesive properties of the coating films [very excellent: ⊚, excellent: ○, moderate: Δ, poor: x].

4) Heat resistance test: After leaving alone the specimens at a test temperature condition of 120±2° C. for 240 hours, the specimens were taken out to leave them alone at room temperature for 1 hour, and heat resistance tests of the specimens were evaluated by checking if there were remarkable discoloration, decolorization, swelling, cracks, gloss drop, etc. on coating films, and if there were something wrong with adhesive properties of the coating films [very excellent: ⊚, excellent: ○, moderate: Δ, poor: x].

5) Thermal shock resistance cycle test: After repeatedly passing the specimens through processes of 80±2° C.×3 h, room temperature 1 h, 50±2° C. and 95% RH×5 h, −30° C.×3 h, and room temperature 1 h ten times, the specimens repeatedly passing through the processes were left alone at room temperature, and thermal shock resistance cycle tests of the specimens were evaluated by checking if there were remarkable discoloration, decolorization, swelling, cracks, gloss drop, etc. on coating films, and if there were something wrong with adhesive properties of the coating films [very excellent: ⊚, excellent: ○, moderate: Δ, poor: x].

6) Weatherability tests (Weather-O-Meter test, Eye Super UV test): The specimens were respectively evaluated in accordance with an accelerated weathering test method, and adhesive properties of the coating films after performing the weatherability tests of coating films were evaluated according to evaluation standards [very excellent: ⊚, excellent: ○, moderate: Δ, poor: x] using measuring equipment Ci 5000, ATLAS, and SUV-W151 manufactured by Iwasaki Electric Co., Ltd respectively in Weather-O-Meter test and eye super UV test.

The Weather-O-Meter test was progressed at two conditions, and the respective equipment setting conditions are as represented in Table 2.

TABLE 2

|  | WOM A | WOM B |
|---|---|---|
| Inner Filter | Quartz | Pyrex S |
| Outer Filter | Boro | Pyrex S |
| Wavelength Cut-off (nm) | 270 | 300 |
| Irrad. (W/m$^2$/nm @340 nm) | 0.55 | 0.50 |
| Air Temp (° C.) | 50 | 40 |
| Black Panel Temp (° C.) | 70 | 65 |
| Relative Humidity (%) | 50 | 70 |
| Light (min) | 100 | 102 |
| Light/Mist (min) | 20 | 18 |
| Dark (min) | 60 | — |

TABLE 3

|  |  | Examples | | | | | | | Comparative Examples | | |
|---|---|---|---|---|---|---|---|---|---|---|---|
|  |  | 1 | 2 | 3 | 4 | 5 | 6 | 7 | A | B | C |
| Adhesive property (initial) | | 100/100 | 100/100 | 100/100 | 100/100 | 100/100 | 100/100 | 100/100 | 100/100 | 100/100 | 100/100 |
| Humidity resistance | | ○ | ⊚ | ⊚ | ○ | ○ | ⊚ | ⊚ | ⊚ | ⊚ | ○ |
| Water resistance | | ○ | ⊚ | ⊚ | ○ | ○ | ⊚ | ⊚ | ⊚ | ⊚ | ○ |
| Heat resistance | | ○ | ⊚ | ⊚ | ○ | ○ | ⊚ | ⊚ | ○ | ⊚ | ○ |
| Thermal shock resistance cycle | | ○ | ⊚ | ⊚ | ○ | ○ | ⊚ | ⊚ | ⊚ | ○ | ○ |
| Weatherability test 1 | ΔE | 2.5 | 2.4 | 2.5 | 2.6 | 2.5 | 2.9 | 3.6 | 14.5 | 3.5 | 16.9 |
|  | Adhesion | ⊚ | ⊚ | ⊚ | ○ | Δ | ⊚ | ○ | ⊚ | Δ | ⊚ |
| Weatherability test 2 | ΔE | 3.9 | 3.68 | 3.74 | 3.89 | 3.7 | 3.71 | 3.9 | 10.8 | 6 | 9.8 |
|  | Adhesion | ⊚ | ⊚ | ⊚ | ⊚ | Δ | ⊚ | Δ | X | X | ⊚ |
| Weatherability test 3 | ΔE | 2.8 | 2.1 | 2.3 | 2.3 | 2.5 | 2.3 | 4.9 | 27.0 | 4.9 | 29.0 |
|  | Adhesion | ○ | ⊚ | ⊚ | ○ | Δ | ⊚ | Δ | X | X | X |

Weatherability test 1: WOM A, 5000 KJ/m$^2$, about 3800 hours.

Weatherability test 2: WOM B, 14340 KJ/m$^2$, about 8000 hours.

Weatherability test 3: S-UV, 8000 KJ/m$^2$, about 1200 hours.

As can be seen from the Table 3, the compositions prepared in Examples 1 to 7 of the present invention were excellent in physical properties, and satisfied all required standards in accelerated weathering tests. On the other hand, current products of Comparative Example A and Comparative Example B did not satisfy all required standards in weatherability. Although the product of Comparative Example C met the properties other than weatherability, it did not satisfy the required standard in weatherability. Further, as can be seen from the weatherability test results of Examples 1 to 7, with the raw material E, the weatherability was improved. Therefore, it shows that the weatherability can be influenced by adjusting the content of the material E.

Meanwhile, the water contained in the paints was measured by Karl-Fischer method using a measuring device MKS-210 by recycling five times the compositions of Example 1 and Comparative Example B in order to compare recycling characteristics of paint compositions. As results of the tests, the water content in the paint of Comparative Example B was increased from 0.03% initially to 0.12% after conducting the five-times recycling process, and interlayer delaminating and whitening phenomena were exhibited in the paint of Comparative Example B after the recycling process. On the other hand, the water content in the paint of Example 1 was only increased from 0.03% initially to 0.04% after the five-times recycling process was conducted, and any physical properties were not changed in the paint of Example 1 even after the recycling process. Therefore, a paint composition of the present invention results in a large paint reduction effect and is environmentally friendly by having excellent recycling characteristics.

Further, the results of comparing initial color (color sense) characteristics of the paint compositions for Examples 1 to 4 and Comparative Examples A and B using a spectrophotometer CM-3600A manufactured by Konica Minolta are shown in the following Table 4.

TABLE 4

|  | Y.I. | L* | a* | b* |
|---|---|---|---|---|
| Comparative Example A | −2.6 | 88.6 | −1.03 | −0.85 |
| Comparative Example B | −5.73 | 88.84 | −0.36 | −2.62 |
| Example 1 | −6.10 | 88.89 | −0.39 | −2.78 |
| Example 2 | −6.24 | 88.79 | −0.42 | −2.83 |
| Example 3 | −6.01 | 88.83 | −0.41 | −2.73 |
| Example 4 | −6.15 | 88.88 | −0.4 | −2.8 |

As can be seen from the results of Table 4, excellent initial colors with less yellowing could be achieved in the paint compositions for Examples of the present invention. On the other hand, an initial color of Comparative Example A was poor than those of Examples since it was a yellow color.

Further, the initial blue colors of Examples were further more excellent than an initial blue color of Comparative Example B.

Further, the results of comparing UV blocking capabilities of the paint compositions using a UV power measuring device UV Power Puck after coating and hardening of paint compositions for Example 1 and Comparative Example A are shown in the following Table 5.

TABLE 5

|  | Incident UV energy | Comparative Example A | Example 1 |
|---|---|---|---|
| UV-A | 1120 | 80 | 63 |
| UV-B | 255 | 62 | 0 |
| UV-C | 16 | 0 | 0 |

As can be seen from the results of Table 5, the paint compositions according to Examples of the present invention exhibited excellent UV blocking capabilities compared to the paint composition according to Comparative Example A.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A photocurable paint composition comprising:
    (A) multifunctional polyurethane acrylate having 5 or more functional groups;
    (B) monofunctional or difunctional polyurethane acrylate;
    (C) combination of monofunctional acrylate, difunctional acrylate, and trifunctional acrylate;
    (D) photo initiator;
    (E) triazine-based ultraviolet absorbent having two or more UV absorber groups; and
    (F) organic solvent,
    wherein the component E is contained in an amount of 0.01 to 2.5% by weight of the total composition weight.

2. The photocurable paint composition of claim 1, wherein the component E is contained in an amount of 0.1 to 2% by weight of the total composition weight.

3. The photocurable paint composition of claim 1, wherein the component A is an aliphatic polyurethane acrylate oligomer having 6 to 15 polymerizable functional groups.

4. The photocurable paint composition of claim 1, wherein the component B is an aliphatic polyurethane acrylate oligomer having two polymerizable functional groups.

5. The photocurable paint composition of claim 1, wherein the component D comprises a short-wavelength initiator and a long-wavelength initiator.

6. The photocurable paint composition of claim 5, wherein the short-wavelength initiator is 1-hydroxycyclohexylphenylketone, and the long-wavelength initiator is bis (2, 4, 6-trimethylbenzoyl)-phenylphosphine oxide.

7. The photocurable paint composition of claim 1, wherein the component E is a hydroxyphenyltriazine derivative having two or more ultraviolet-absorbing ester groups.

8. The photocurable paint composition of claim 1, wherein the component F is methoxy propanol.

9. A molded article comprising a cured coating layer formed from the photocurable paint composition according to claim 1.

10. The molded article of claim 9, wherein the molded article is made of plastics.

11. The molded article of claim 9, wherein the molded article is an automotive headlamp.

* * * * *